Feb. 21, 1961 L. F. BRAMBLE 2,972,558
ASPHALTIC SEAL ASSEMBLIES
Filed Oct. 8, 1956
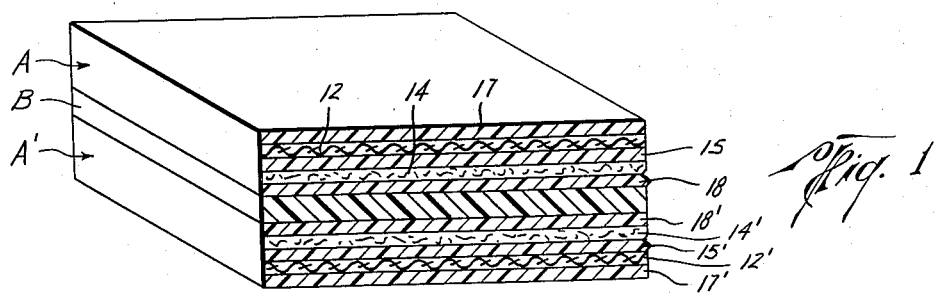
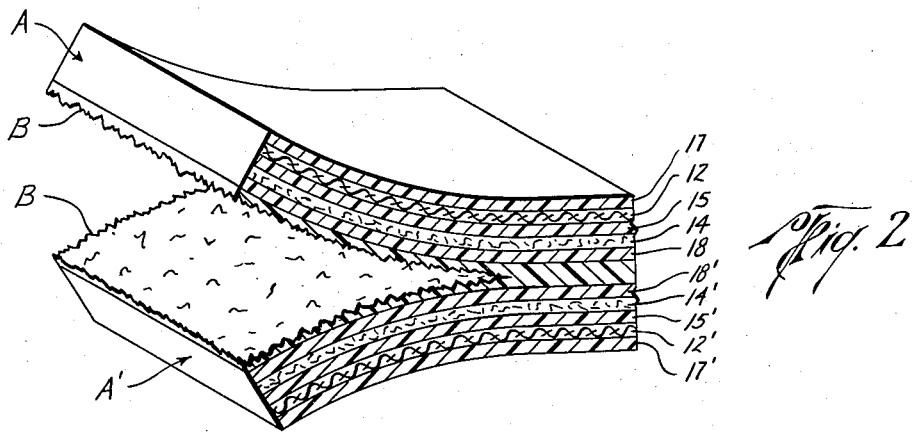
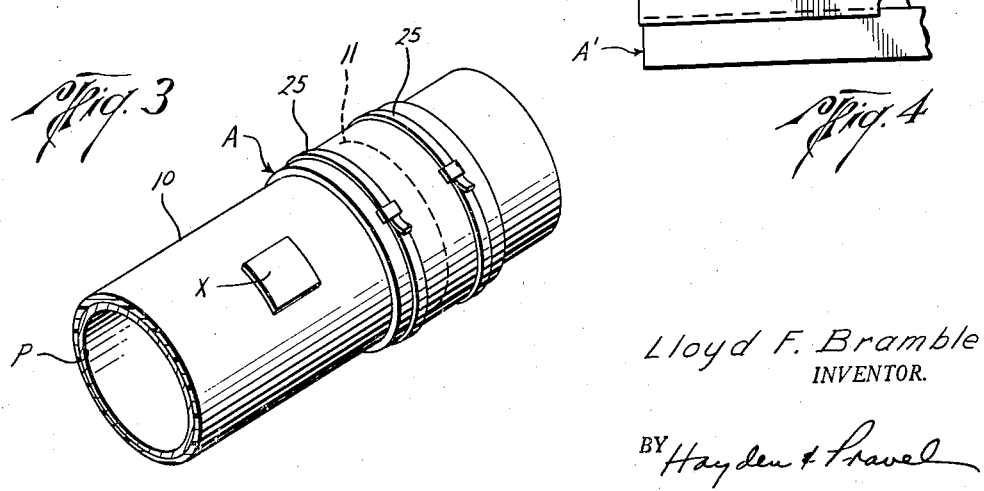
Lloyd F. Bramble
INVENTOR.
BY Hayden & Pravel
ATTORNEYS

United States Patent Office 2,972,558
Patented Feb. 21, 1961

2,972,558
ASPHALTIC SEAL ASSEMBLIES
Lloyd F. Bramble, Melrose Bldg., Houston, Tex.
Filed Oct. 8, 1956, Ser. No. 614,468
12 Claims. (Cl. 154—53.5)

This invention relates to asphaltic seal assemblies.

It is an object of this invention to provide a new and improved prefabricated laminated asphaltic seal assembly having an asphaltic adhesive which is protected against external contact during shipping, storage, and otherwise prior to use, but which is adapted to be exposed for adhering to the surfaces of various objects such as the welded joints of pipelines, holidays in pipeline coatings, roofs, and other similar surfaces and objects.

An important object of this invention is to provide a new and improved asphatic seal assembly wherein reinforced asphaltic strips are positioned together with an asphaltic adhesive on the adjacent surfaces of the strips to prevent such adhesive from being contacted by other objects until time for use, and wherein such adhesive is adapted to remain in substantially equal amounts on each strip when the strips are separated from each other for use, whereby each strip is provided with adhesive for adhering same to various surfaces and objects.

Another object of this invention is to provide a new and improved laminated asphaltic seal assembly which is only temporarily retained in a laminated condition in order to protect an inner asphaltic adhesive layer from adhering to surfaces or objects external of said assembly prior to use so that upon the separation of the layers of the laminated seal assembly the adhesive is provided on the separated portions of the assembly in substantially equal amounts and in a tacky adhesive condition to permit the bonding of such separated portions to other surfaces and objects.

A further object of this invention is to provide a new and improved prefabricated asphaltic seal assembly which has a plurality of composite layers each of which has an asphaltic coating on at least one of its surfaces, the layers being positioned with the coated layers adjacent to each other and with an asphaltic adhesive therebetween which is formed either by a solvent softening of the adjacent asphalt coatings on the layers or by an added adhesive therebetween having a solvent component, the adhesive in either form being separable so that both layers are provided with an adhesive surface for bonding to various surfaces and objects, and the asphalt coating on each composite layer preventing any material loss of the solvent by adsorption in the composite layer.

A still further object of this invention is to provide a new and improved prefabricated asphaltic seal assembly which is adapted to be shipped flat in an air-tight package with an adhesive disposed between adjacent layers of the assembly whereby the adhesive is prevented from hardening and is maintained in a confined position out of contact with any surfaces except those on which the adhesive is to be later used in separately bonding the layers to various objects.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

Fig. 1 is a sectional view illustrating the preferred embodiment of this invention prior to the separation of the composite layers thereof for use.

Fig. 2 is a view similar to Fig. 1, but illustrating the asphaltic seal assembly of this invention as the composite layers thereof are being separated from each other to be applied to various surfaces or objects.

Fig. 3 is an isometric view of a portion of a pipe line with the product of this invention applied thereto to illustrate several typical uses thereof.

Fig. 4 is an elevation illustrating a portion of the assembly of Fig. 1 with a sealing strip around the external edge of the adhesive layer to prevent the hardening of the adhesive without using a separate bag or wrapping.

In the drawings, the letters A and A' designate composite asphaltic layers which, as will be explained in detail, are temporarily bonded together with an adhesive B therebetween to form a laminated asphaltic seal assembly. Briefly, the adhesive B includes, in addition to asphalt, a softening agent or solvent which maintains the adhesive B in a relatively soft tacky adhesive condition so long as the assembly is confined within an air-tight enclosure to prevent the evaporation of the softening agent or solvent. Therefore, ordinarily, the assembly of this invention as shown in Fig. 1 is stored and shipped in air-tight enclosures such as polyethylene or other plastic bags or wrappings. When it is desired to use the composite layers or strips A and A', the enclosure is removed and the layers A and A' are separated. The asphaltic adhesive B is formulated so that some of such adhesive B adheres to each of the layers A and A', and preferably substantially equal portions of the adhesive B adheres to the layers A ant A'. Thus, since the adhesive B is in a soft sticky adhesive condition when the layers A and A' are separated from each other, each of the layers A and A' may be used for permanently bonding to various surfaces and objects.

For example, either of the composite layers A or A' could be used for permanently bonding to the welded joints of pipelines as indicated in Fig. 3. The pipeline P of Fig. 3 is of the type which ordinarily has a factory applied coating of asphalt or enamel 10 extending up to the area adjacent the ends 11 of the pipe sections of the pipeline P. One strip of the composite lining A with a portion of the adhesive B on the inner surface thereof is wrapped about the unprotected portion of the pipeline P at the joint formed at the abutting welded ends 11 thereof. Such strip of the composite layer A may be overlapping with the coating 10 or it may be adjacent thereto so as to provide complete coverage of the area of the pipeline P adjacent the welded joint or ends 11. A small section or patch designated by the letter X in Fig. 3 may be made from either of the composite layers A or A' and would be applied to the pipeline P at an exposed area or imperfection in the coating 10 which is often called a "holiday." Other uses for the product of this invention will be referred to and will become evident from the following detailed description.

Considering the preferred embodiment of the invention as illustrated in the drawings, the composite layer or strip A is composed of two reinforcing layers 12 and 14 with a layer of asphalt 15 therebetween. The external surfaces of the reinforcing layers 12 and 14 are provided with asphaltic coatings 17 and 18.

In the ordinary case, the layer 14 is formed of a felt and the layer 12 is formed of burlap. Thus, by way of example, the composite asphaltic layer A may be formed by uniting a layer 14 of felt which has been saturated with asphalt to a burlap layer 12 which has been coated on both sides with an asphaltic coating. While the asphaltic coating on the burlap is still hot or in the softened condition, the saturated felt and the coated burlap are brought together between laminating rolls, as will be well understood. An additional layer of asphalt is then applied to the saturated felt to provide the coating 18 which is positioned adjacent to the adhesive B.

The composite layer A thus formed has the asphaltic coating 18 which is of sufficient thickness to prevent substantially all of the solvent or softening agent in the adhesive B from penetrating therethrough into the felt 14 so as to prevent loss of the solvent by adsorption in the felt 14. Any loss of the solvent or softening agent from the adhesive B would result in a hardening or stiffening of the adhesive B so that it would not be sufficiently soft and tacky when separated for use later. Such thickness may vary, but in the usual case the thickness of the layer 18 must not be less than about 1/16 of an inch.

The asphaltic materials used in the intermediate layer 15 and the outer coatings 17 and 18 may be substantially pure asphalt or it may have fillers or extenders therewith of the type commonly used in the coating formulations for roofing materials. Such asphaltic materials used in the layer 15 and the coatings 17 and 18 should have a melting point (ball and ring) of from about 160° F. to about 230° F. and it should have a penetration at 77° F. of from about 10 to about 40.

Although the felt layer 14 is shown as being closer to the adhesive B than the burlap layer 12, the position of such layers may be reversed, if desired. Also, it is not necessary to have both of the layers 12 and 14. Thus, only one of such layers 12 and 14 may be used for reinforcing the composite layer or strip A. Either or both of the layers 12 and 14 may be formed of burlap, felt, glass fabric, plastics or synthetic resins, asbestos, kraft paper, jute, and other similar reinforcing materials. Also, the layers 12 and 14 may be the same material, if desired.

As illustrated in the drawings, the composite layer A' is constructed of layers 12', 14', 15', 17' and 18' which are identical with the correspondingly numbered layers in the composite layer A. The composite layer A' may be varied in the same manner as previously described above in connection with the composite layer A. It will be noted that the composite layer A' has the coating 18' of asphaltic material adjacent to the adhesive B which is of sufficient thickness to prevent the penetration of the softening agent or solvent of the adhesive B therethrough. Thus, the solvent or softening agent of the adhesive B is confined between the asphaltic coating layers 18 and 18' so that its only loss is by evaporation, but such evaporation is also prevented prior to use by confining same in an air-tight enclosure or bag, as previously explained.

The adhesive material B which is disposed between the composite asphaltic layers A and A', in its preferred form, includes the following components in the following preferred percentages by volume:

|  | Percent |
|---|---|
| Asphalt | 40 |
| Solvent | 40 |
| Fillers | 15 |
| Fibers | 5 |

However, the quantities of the various components of the adhesive B may vary in accordance with the following percentage ranges:

|  | Percent |
|---|---|
| Asphalt | 20 to 70 |
| Solvent | 20 to 60 |
| Fillers | 5 to 20 |
| Fibers | 5 to 15 |

The asphalt used in the asphaltic adhesive B preferably has a melting point (ball and ring) from about 120° F. to about 220° F. and has a penetration at 77° F. of from about 10 to about 50. The solvent or softening agent used in the adhesive B may be selected from kerosene, heavy naptha, or mineral spirits. The fibers used may be selected from asbestos, felt, paper and similar fibrous materials. Ordinarily the asbestos fibers would be employed and they would have a sieve grade from about 0-0-0-16 to about 0-0-16-0. The fillers would be selected from silica, slate flour, talc and other finely divided mineral fillers having a size from about 150 to about 425 mesh.

The final adhesive B as applied between the layers A and A' will have a viscosity (Stormer) from about 50 to about 2000 r.p.m. Thus, the adhesive B must be sufficiently soft to permit the separation thereof so that substantially equal amounts of the adhesive B remain on each of the layers A and A' when they are separated from each other. However, the adhesive B must not be so thin or so flowable as to flow from the laminated seal assembly shown in Fig. 1 of the drawings.

In some instances it will not be necessary to include the fillers and the fibers, but instead a plain adhesive may be used between the composite layers A and A' which may be made up as follows (percentages by volume):

|  | Percent |
|---|---|
| Asphalt | 10 to 90 |
| Solvent | 90 to 10 |

The preferred range for such plain adhesive is however as follows (percentages by volume):

|  | Percent |
|---|---|
| Asphalt | 30–50 |
| Solvent | 50–70 |

When a large quantity of solvent is employed, the inner asphaltic coatings 18 and 18' are themselves softened and rendered adhesive so that to some extent, the adhesive includes the softened layers 18 and 18'. It is also possible that the softening of the asphaltic layers or coatings 18 and 18' could be relied upon solely to adhere the composite layers A and A' together and to provide the necessary adhesive surface for subsequent application to other surfaces or bodies. However, the components in the percentages given above for the plain adhesive are preferred because the presence of the asphalt with the solvent when applied between the coatings 18 and 18' provides a more viscous coating of the adhesive than would be present with the pure solvent applied thereto to simply render the layers 18 and 18' adhesive.

From the foregoing description, it can be seen that each of the composite layers A and A' when separated from each other for use provides a patch or sealing material which requires no further application of asphalt or adhesive thereto. Thus, a sealing material is provided which has a high bursting strength, high tensile strength, toughness, resistance to shock, and other strength, and at the same time the adhesive is soft and tacky and is readily available in the field or in any other place where it is desired to use such composite layers A or A' for sealing or patching work. The adhesive B is protected against contact by external objects or surfaces during shipping and transportation and is maintained in its tacky adhesive condition during such shipping or storage, but when it is desired to use either or both of the composite layers A and A' for applying to an area to be sealed or patched, the adhesive B is readily available and may be easily obtained by separating the composite layers A and A' from each other. When such separation occurs, the adhesive B separates into substantially equal portions on each of the composite layers A and A'.

As previously explained, one of the uses to which the invention may be applied is illustrated in Fig. 3, in which one of the composite strips A is shown as applied to the normally unprotected area at a welded joint 11 at a pipeline P. The present procedure in protecting the exposed welded joint portions of the pipeline P is to provide an asphaltic coating thereon by pouring melted asphalt over the exposed section of the pipeline P in the field. Such procedure is often extremely difficult and frequently is very time consuming. However, with the present invention, the composite layers A and A' are separated in the field when it is desired to apply either or both the same to the pipeline P, and then the adhesive side thereof is applied as shown in Fig. 3. Additional retaining straps 25 which are formed of metal and are of a conventional construction may be used to facilitate the positioning and holding of the asphaltic strip A in position until the adhesive B thoroughly hardens to complete the permanent bond with the pipeline P.

The smaller section of the composite lining A or A' which is designated by the letter X in Fig. 3 is applied in substantially the same manner as that strip which is adhered to the welded joint of the pipeline P. The patch X serves to cover up a holiday or opening in the enamel or coating 10 on the pipeline P so as to prevent corrosion from developing at that point.

In addition to the foregoing described uses for the product of this invention, other uses will readily occur to those skilled in the art, particularly in connection with the sealing of concrete, vitrified clay products, floor covering, wall covering, roof covering, rock shield, and any and all other types of anti-corrosive protection, insulation and the like. Such material is particularly suitable for re-roofing and for applying to a new roof. The length, width and sizes of the assembly may, of course, be varied to suit particular conditions and uses.

In Fig. 4 of the drawings, a modification is illustrated wherein a sealing layer or strip C is provided externally of the adhesive layer B. In such case, the sealing layer C completely surrounds the adhesive layer B and extends therefrom into sealing contact with the layers A and A' so that the softening agent or solvent cannot escape to any appreciable extent from the adhesive layer B. Thus, with the construction shown in Fig. 4, it is not necessary to confine the assembly thereof in an air-tight enclosure such as a bag or other wrapping as previously referred to in connection with Fig. 1. The asphaltic layers 18 and 18' together with the sealing strip C completely enclose the adhesive B so that evaporation of the softening agent or solvent is substantially impossible.

When the composite layers A and A' are to be separated for use, the sealing strip C is readily cracked, split, stripped or otherwise separated to expose the adhesive layer B. The sealing strip is therefore preferably applied in a relatively thin layer to facilitate removal and it will ordinarily be formed from an asphalt having the same melting point and penetration characteristics as specified previously for the coatings 18 and 18'. However, the sealing strip C may be formed from a synthetic resin or plastic or other similar material that will seal the adhesive B to prevent the evaporation of the solvent therefrom and which may be cracked, stripped, or otherwise separated for exposing the adhesive B when desired.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A laminated asphaltic seal assembly, including an asphaltic adhesive layer having a softening agent therewith to maintain said adhesive layer in a softened tacky condition prior to the evaporation of said agent, a composite asphaltic layer on each side of said adhesive layer for temporarily bonding such composite asphaltic layers together with said adhesive layer therebetween, each composite asphaltic layer having an inner asphaltic coating of sufficient thickness to prevent penetration of the components of the adhesive into each composite layer beyond the inner asphaltic coating thereon to thereby avoid any material loss of said softening agent by adsorption into said composite layers, said adhesive layer being separable into two soft adhesive layers so as to leave an adhesive layer on each composite asphaltic layer when such composite asphaltic layers are separated so that each composite asphaltic layer may be permanently bonded to another surface when the adhesive layer therewith hardens by the evaporation of the softening agent.

2. The structure set forth in claim 1, including in combination therewith a substantially air-tight enclosure for preventing the evaporation of said softening agent prior to use whereby said adhesive remains in a softened tacky condition until removed from said enclosure, said adhesive forming a permanent bond upon the removal of said assembly from said enclosure and upon the separation of the composition layers from each other and the placing of same on another surface.

3. The structure set forth in claim 1, wherein each of said composite asphaltic layers has an outer asphaltic coating thereon to prevent shrinkage of each composite layer.

4. The structure set forth in claim 1, wherein said softening agent is a solvent selected from the group consisting of kerosene, heavy naptha, and mineral spirits.

5. The structure set forth in claim 1, wherein said softening agent is a solvent selected from the group consisting of kerosene, heavy naptha, and mineral spirits, said solvent being present in the adhesive in an amount from about 10% to about 90%.

6. The structure set forth in claim 1, wherein said softening agent is a solvent selected from the group consisting of kerosene, heavy naptha, and mineral spirits, and wherein said asphaltic adhesive also includes fibers and fillers, with the asphalt being present in an amount of from about 20% to about 70%, said solvent being present in an amount from about 20% to about 60% and said fiber and fillers being present in an amount from about 10% to about 35%.

7. The structure set forth in claim 1, including a sealing strip applied to the external edge of the adhesive for preventing to completely enclose the adhesive for preventing premature hardening thereof prior to the separation of said composite layers for use.

8. The structure set forth in claim 1, including an airtight enclosure for confining said assembly to prevent the premature hardening of the adhesive.

9. The structure set forth in claim 1, including enclosure means surrounding the adhesive for enclosing said adhesive to prevent the evaporation of said softening agent prior to use, whereby adhesive remains in a softened tacky condition until said enclosure means is removed from said adhesive.

10. The structure set forth in claim 9, wherein said enclosure means is a bag completely surrounding said assembly.

11. The structure set forth in claim 9, wherein said enclosure means is an annular strip of sealing material which surrounds the adhesive and is substantially impervious to the passage of the softening agent therethrough but which may be separated upon the separation of the composite layers to expose the adhesive for use.

12. A laminated asphaltic seal assembly, including an asphaltic adhesive layer having a softening agent therewith to maintain said adhesive layer in a softened tacky condition prior to the evaporation of said agent, a composite asphaltic layer on each side of said adhesive layer for temporarily bonding such composite asphaltic layers together with said adhesive layer therebetween, each composite asphaltic layer having a layer of asphalt adjacent to said asphaltic adhesive layer serving as a barrier to prevent penetration of the components of the adhesive into each composite layer beyond the barrier to thereby avoid any material loss of said softening agent by adsorption into said composite layers, said adhesive layer being separable into two soft adhesive layers so as to leave an adhesive layer on each composite asphaltic layer when such composite asphaltic layers are separated so that each composite asphaltic layer may be permanently bonded to another surface when the adhesive layer therewith hardens by the evaporation of the softening agent.

References Cited in the file of this patent

UNITED STATES PATENTS

| | | |
|---|---|---|
| 447,121 | Stecher | Feb. 24, 1891 |
| 1,857,811 | George | May 10, 1932 |
| 2,046,924 | Pendergast | July 7, 1936 |
| 2,063,999 | Harrison | Dec. 15, 1936 |
| 2,101,874 | Rowe | Dec. 14, 1937 |
| 2,215,061 | Alt | Sept. 17, 1940 |
| 2,421,602 | Dooling | June 3, 1947 |
| 2,425,805 | Hyman | Aug. 19, 1947 |
| 2,768,902 | Scholl | Oct. 30, 1956 |
| 2,771,745 | Bramble | Nov. 27, 1956 |